（12）United States Patent
Deng

(10) Patent No.: US 12,326,561 B2
(45) Date of Patent: Jun. 10, 2025

(54) WAVEGUIDE DEVICE AND OPTICAL ENGINE

(71) Applicant: HTC Corporation, Taoyuan (TW)

(72) Inventor: Qing-Long Deng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 699 days.

(21) Appl. No.: 17/453,859

(22) Filed: Nov. 8, 2021

(65) Prior Publication Data

US 2022/0146831 A1    May 12, 2022

Related U.S. Application Data

(60) Provisional application No. 63/111,084, filed on Nov. 9, 2020.

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0035* (2013.01); *G02B 6/0065* (2013.01); *G02B 2027/0174* (2013.01)

(58) Field of Classification Search
CPC .......... G02B 27/0172; G02B 6/0016; G02B 6/0035; G02B 2027/0174; G02B 6/0036; G02B 27/4205; G02B 5/1842; G02B 5/18; G02B 2005/1804; G02B 5/1823; G02B 5/1861; G02B 5/1866; G02B 27/01; G02B 27/0103
USPC ................. 359/565, 569, 558, 599
See application file for complete search history.

(56) References Cited

U.S. PATENT DOCUMENTS

| 2015/0277116 | A1* | 10/2015 | Richards ............ G02B 27/0103 |
| | | | 359/13 |
| 2017/0315346 | A1* | 11/2017 | Tervo ................... G02B 5/1819 |
| 2018/0052320 | A1* | 2/2018 | Curtis .................... G02B 1/002 |
| 2018/0275350 | A1* | 9/2018 | Oh ..................... G02B 27/0172 |
| 2019/0086674 | A1* | 3/2019 | Sinay ................. G02B 27/0172 |

(Continued)

FOREIGN PATENT DOCUMENTS

| TW | 201932959 A | 8/2019 |
| TW | 202022412 A | 6/2020 |

OTHER PUBLICATIONS

Corresponding Taiwan office action issued on Jun. 6, 2022.

*Primary Examiner* — William R Alexander
*Assistant Examiner* — Mackenzi Waddell
(74) *Attorney, Agent, or Firm* — CKC & Partners Co., LLC

(57) ABSTRACT

A waveguide device includes a first diffractive element, a second diffractive element, a third diffractive element, and a waveguide element. The first diffractive element has a first grating configured to diffract light of a wavelength to propagate with a first diffraction angle. The second diffractive element has a second grating configured to diffract the light of the wavelength to propagate with a second diffraction angle. The third diffractive element has a third grating and a fourth grating. The third grating is configured to diffract the light of the wavelength to propagate with the first diffraction angle. The fourth grating is configured to diffract the light of the wavelength to propagate with the second diffraction angle. The waveguide element configured to guide light propagated from the first diffractive element and the second diffractive element to the third diffractive element.

16 Claims, 8 Drawing Sheets

(56) References Cited

U.S. PATENT DOCUMENTS

2019/0121027 A1\* 4/2019 Popovich ............. G02B 27/283
2020/0249754 A1\* 8/2020 Morozov ............. G06F 3/0304

\* cited by examiner

WAVEGUIDE DEVICE AND OPTICAL ENGINE

CROSS-REFERENCE TO RELATED APPLICATION

This application claims priority to U.S. Provisional Application Ser. No. 63/111,084, filed on Nov. 9, 2020, which is herein incorporated by reference.

BACKGROUND

Technical Field

The present disclosure relates to a waveguide device and an optical engine.

Description of Related Art

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image to a location where a user of a device can view the image as a virtual image in an augmented reality environment. As this is still an emerging technology, there are certain challenges associated with utilizing waveguides to display images of virtual objects to a user.

Nowadays, many conventional waveguides with diffractive/holographic elements attached thereon have been used. However, this architecture has the disadvantage of light loss. When a first diffractive/holographic element causes the incident light to be diffracted or reflected, the zero order or conjugate transmitting light will directly exit the first diffractive/holographic element, and its intensity is approximately 40% or more of the original intensity. Therefore, the light loss may cause the human eyes to receive less light intensity, and cause additional ghost/stray light to be easily produced.

Accordingly, it is an important issue for the industry to provide an optical engine capable of solving the aforementioned problems.

SUMMARY

An aspect of the disclosure is to provide a waveguide device and an optical engine that can efficiently solve the aforementioned problems.

According to an embodiment of the disclosure, a waveguide device includes a first diffractive element, a second diffractive element, a third diffractive element, and a waveguide element. The first diffractive element has a first grating configured to diffract light of a wavelength to propagate with a first diffraction angle. The second diffractive element has a second grating configured to diffract the light of the wavelength to propagate with a second diffraction angle. The third diffractive element has a third grating and a fourth grating. The third grating is configured to diffract the light of the wavelength to propagate with the first diffraction angle. The fourth grating is configured to diffract the light of the wavelength to propagate with the second diffraction angle. The waveguide element is configured to guide light propagated from the first diffractive element and the second diffractive element to the third diffractive element.

In an embodiment of the disclosure, the third grating and the fourth grating are in a single medium.

In an embodiment of the disclosure, the third grating and the fourth grating intersect.

In an embodiment of the disclosure, the third diffractive element and one of the first diffractive element and the second diffractive element are at an identical side of the waveguide element.

In an embodiment of the disclosure, the first diffractive element and the second diffractive element are at opposite sides of the waveguide element respectively.

In an embodiment of the disclosure, the waveguide element has a first surface and a second surface opposite to each other. The first diffractive element and the second diffractive element are on the first surface and the second surface respectively and aligned with each other in a direction perpendicular to one of the first surface and the second surface.

In an embodiment of the disclosure, one of the first diffractive element and the second diffractive element is a transmissive diffractive element, and another of the first diffractive element and the second diffractive element is a reflective diffractive element.

In an embodiment of the disclosure, a refractive index of the waveguide element is greater than refractive indices of the first diffractive element and the second diffractive element.

In an embodiment of the disclosure, the first, second, and third diffractive elements are spaced apart from each other.

According to an embodiment of the disclosure, an optical engine includes a projector, a first diffractive element, a second diffractive element, a third diffractive element, and a waveguide element. The projector is configured to project light of a wavelength. The first diffractive element has a first grating configured to diffract the light of the wavelength to propagate with a first diffraction angle. The second diffractive element has a second grating configured to diffract the light of the wavelength to propagate with a second diffraction angle. The third diffractive element has a third grating and a fourth grating. The third grating is configured to diffract the light of the wavelength to propagate with the first diffraction angle. The fourth grating is configured to diffract the light of the wavelength to propagate with the second diffraction angle. The waveguide element is configured to guide light propagated from the first diffractive element and the second diffractive element to the third diffractive element.

In an embodiment of the disclosure, the optical engine further includes a beam splitting module. The beam splitting module is optically coupled between the projector and the first diffractive element.

In an embodiment of the disclosure, the beam splitting module includes a plurality of splitters arranged away from the projector along one dimension.

Accordingly, in some embodiments of the optical engine of the present disclosure, a mechanism to recycle the lost light is provided. Specifically, after the light projected by the projector enters the waveguide element through the first diffractive element, most of the lost light (i.e., zero order light or DC term, which is the part of the light that is not diffracted by the first diffractive element) can be reflected back into the waveguide element by the second diffractive element and can be further effectively diffracted by the third diffractive element. Therefore, the intensity of the light outputted by the optical engine can be increased at least by 50%.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
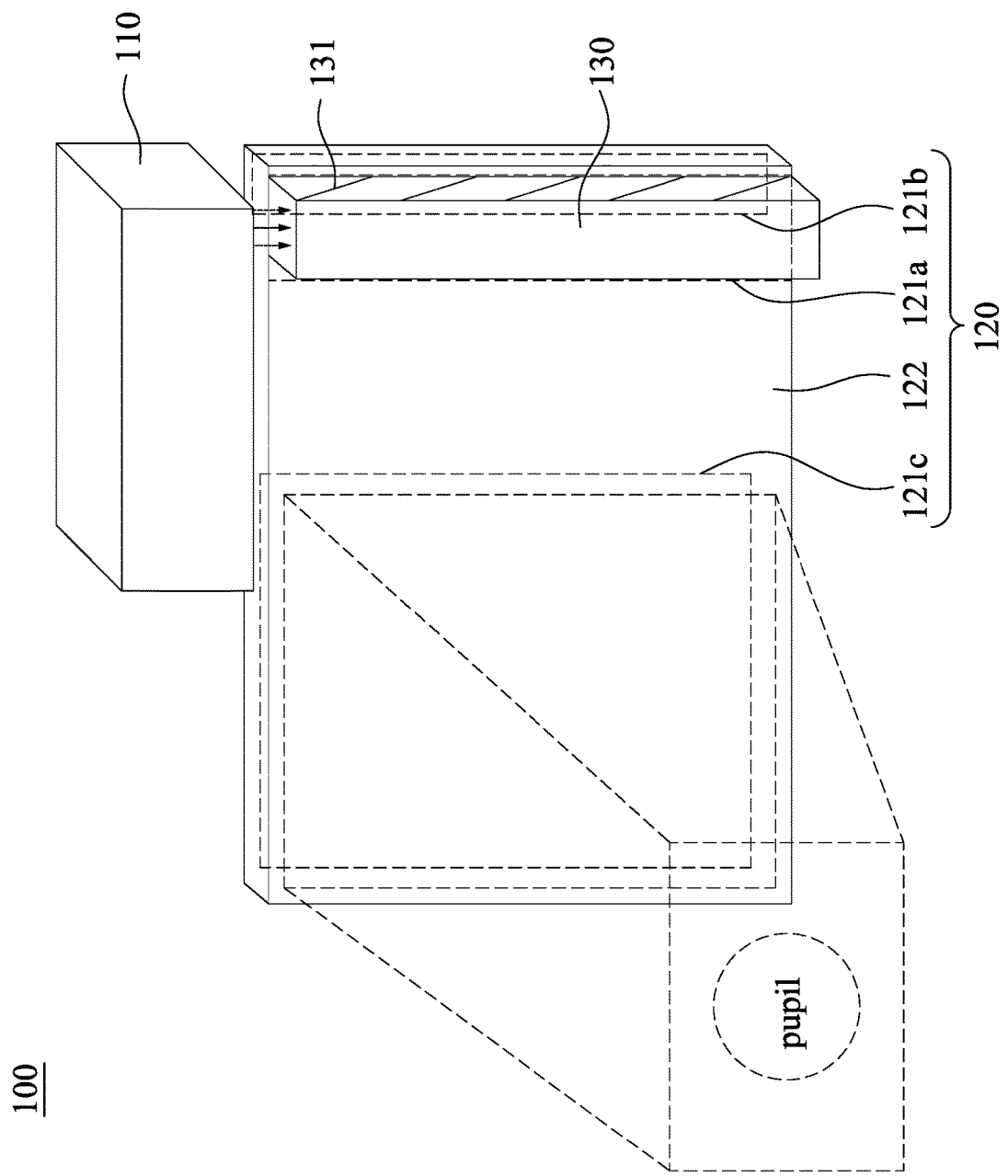
FIG. 1 is a schematic view of an optical engine according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic view of an optical engine 100 according to some embodiments of the present disclosure. As shown in FIG. 1, the optical engine 100 may be used in an augmented reality device (not shown) which can be implemented as head-mounted display (HMD) glasses or other wearable display devices, but is not limited thereto. The optical engine 100 includes a projector 110 and a waveguide device 120. The waveguide device 120 includes a first diffractive element 121a, a second diffractive element 121b, a third diffractive element, 121c, and a waveguide element 122. The first, second, and third diffractive elements 121a, 121b, 121c are attached to the waveguide element 122. The first diffractive element 121a serves as a light guiding element of light-input. The third diffractive element 121c serves as a light guiding element of light-output. That is, light projected by the projector 110 can be inputted to the first diffractive element 121a and outputted from the third diffractive element 121c to reach an eye (i.e., the pupil as shown in FIG. 1) of a user, and the waveguide element 122 is configured to guide the light propagated from the first diffractive element 121a and the second diffractive element 121b to the third diffractive element 121c based on the principle of total internal reflection.

As shown in FIG. 1, the optical engine 100 further includes a beam splitting module 130 optically coupled between the projector 110 and the first diffractive element 121a. That is, the light projected by the projector 110 enters the waveguide element 122 sequentially via the beam splitting module 130 and the first diffractive element 121a. The beam splitting module 130 is configured to expand the images projected by the projector 110 in one dimension, so as to further increase the viewing angle of the images outputted out of the waveguide device 120. In addition, by using the beam splitting module 130, the light outlet of the projector 110 can be designed as a small aperture to avoid the overall volume of the optical engine 100 being too large. In some embodiments, the beam splitting module 130 includes a plurality of splitters 131 arranged away from the projector 110 along the above-mentioned dimension. That is, each of the splitters 131 is optically coupled between the projector 110 and a part of the first diffractive element 121a.

In some embodiments, the projector 110 may be a telecentric system or a non-telecentric system. In some embodiments, the projector 110 may include a DLP (Digital Light Processing) module or a LCOS (Liquid Crystal on Silicon) module or a micro LED display module.

Figure 2:
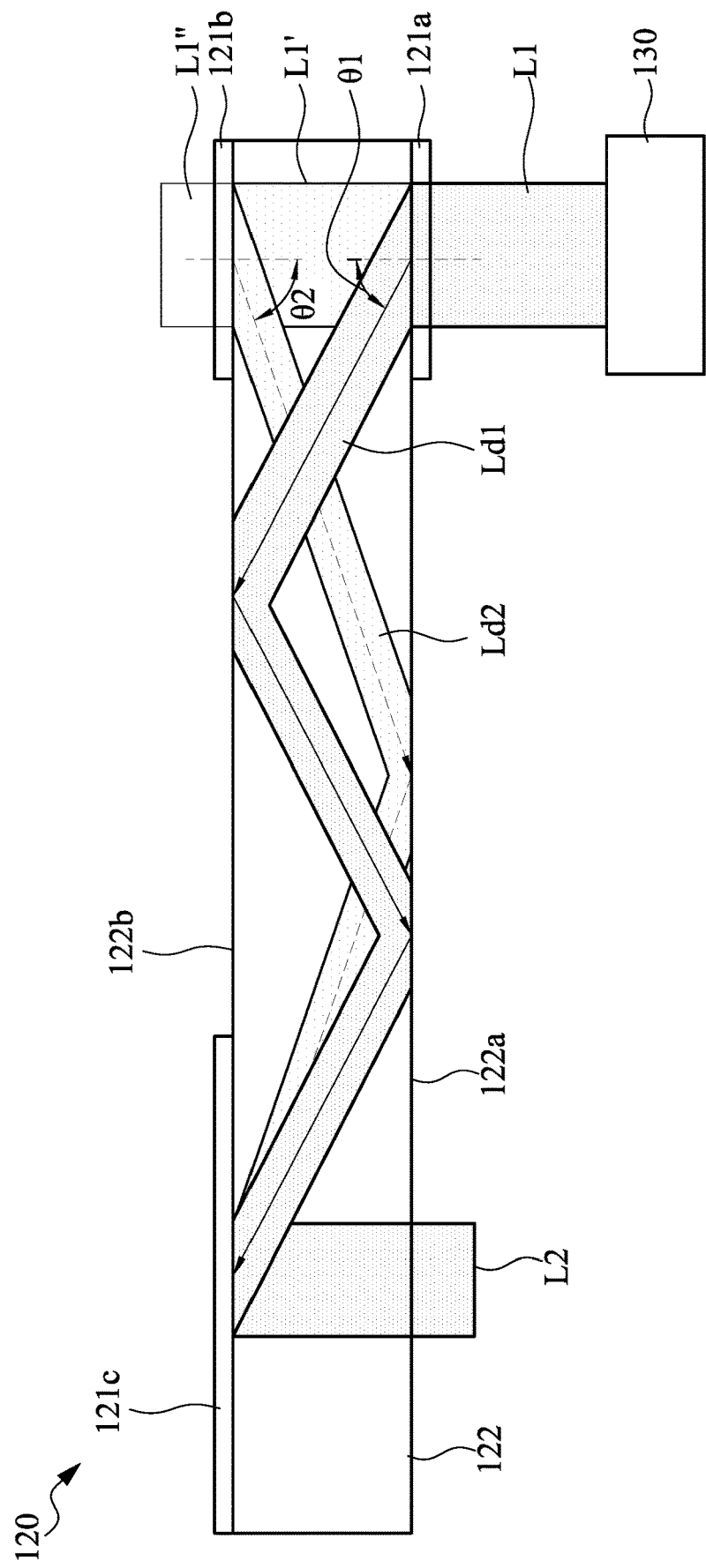
FIG. 2 is a schematic view of a waveguide device and a beam splitting module according to some embodiments of the present disclosure.
Figure 3:
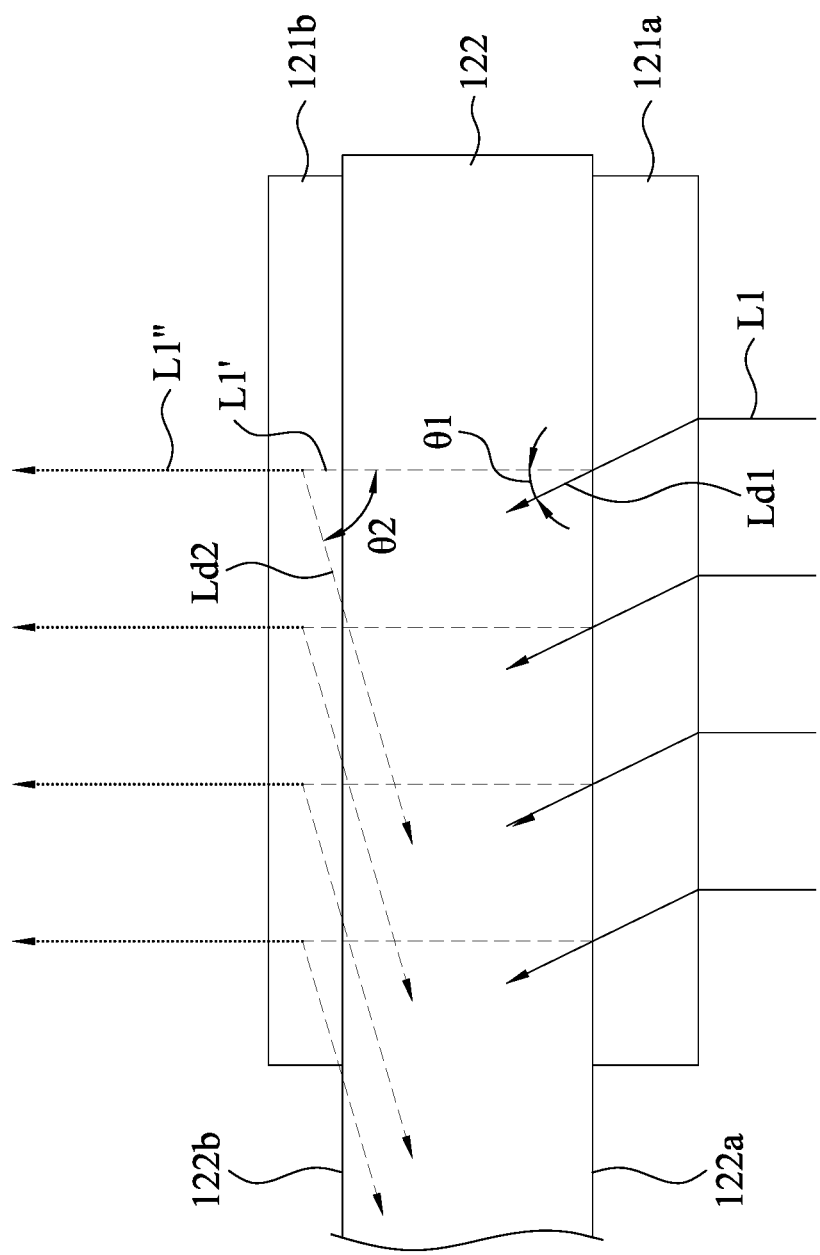
FIG. 3 is a partial schematic view of the waveguide device in FIG. 2.

As shown in FIGS. 2 and 3, in some embodiments, the light L1 projected by the projector 110 may be red light, green light, or blue light, but the disclosure is not limited in this regard. In some embodiments, the wavelength band of the red light may be from about 622 nm to about 642 nm, but the disclosure is not limited in this regard. In some embodiments, the wavelength band of the green light may be from about 522 nm to about 542 nm, but the disclosure is not limited in this regard. In some embodiments, the wavelength band of the blue light may be from about 455 nm to about 475 nm, but the disclosure is not limited in this regard. In some embodiments, the projector 110 adopts light-emitting diodes to project the red light, the green light, and the blue light. In practical applications, the projector 110 may adopt laser diodes to project the red light, the green light, and the blue light with smaller wavelength band.

Figure 4:
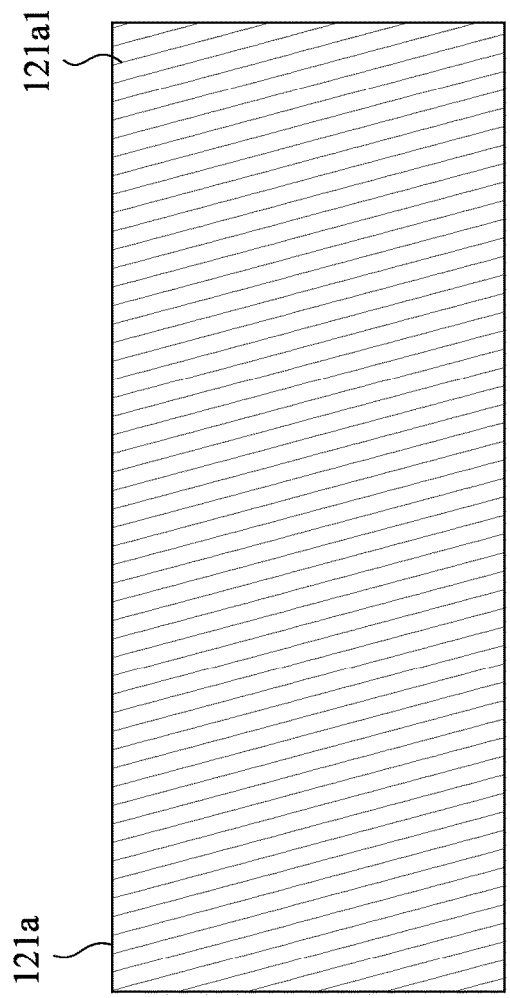
FIG. 4 is a schematic view of a first diffractive element according to some embodiments of the present disclosure.
Figure 5:
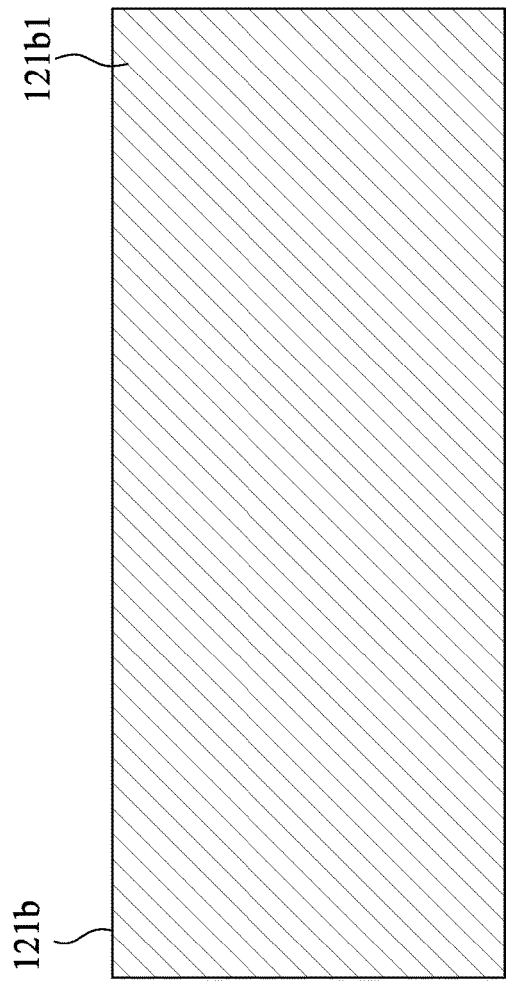
FIG. 5 is a schematic view of a second diffractive element according to some embodiments of the present disclosure.
Figure 6:
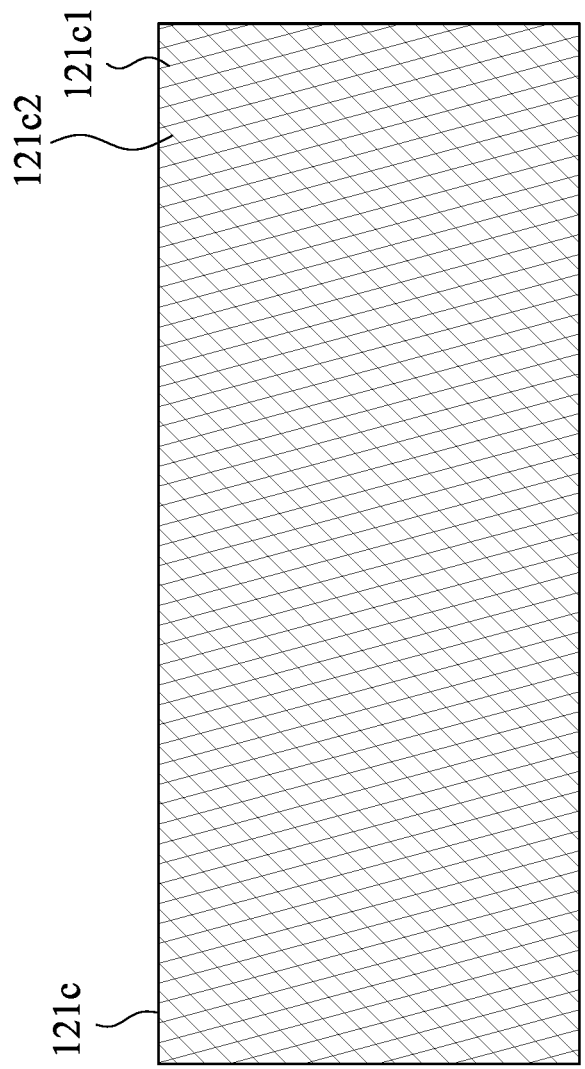
FIG. 6 is a schematic view of the third diffractive element according to some embodiments of the present disclosure.

Reference is made to FIG. 2 to FIG. 6. FIG. 2 is a schematic view of the waveguide device 120 and a beam splitting module 130 according to some embodiments of the present disclosure. FIG. 3 is a partial schematic view of the waveguide device 120 in FIG. 2. FIG. 4 is a schematic view of the first diffractive element 121a according to some embodiments of the present disclosure. FIG. 5 is a schematic view of the second diffractive element 121b according to some embodiments of the present disclosure. FIG. 6 is a schematic view of the third diffractive element 121c according to some embodiments of the present disclosure.

As shown in FIG. 2 to FIG. 6, the first diffractive element 121a has a first grating 121a1. The first grating 121a1 is configured to diffract light of a wavelength to propagate with a first diffraction angle $\theta 1$. For example, the wavelength may be 632 nm within the wavelength band of the red light, 532 nm within the wavelength band of the green light, or 465 nm within the wavelength band of the blue light. The second diffractive element 121b has a second grating 121b1. The second grating 121b1 is configured to diffract the light of the wavelength to propagate with a second diffraction angle θ2. The third diffractive element 121c has a third grating 121c1 and a fourth grating 121c2. The third grating 121c1 is configured to diffract the light of the wavelength to propagate with the first diffraction angle θ1. The fourth grating 121c2 is configured to diffract the light of the wavelength to propagate with the second diffraction angle θ2. The waveguide element 122 is configured to guide light propagated from the first diffractive element 121a and the second diffractive element 121b to the third diffractive element 121c.

As shown in FIG. 2, in the present embodiment, the third diffractive element 121c and the second diffractive element 121b are at an identical side of the waveguide element 122. The first diffractive element 121a and the second diffractive element 121b are at opposite sides of the waveguide element 122 respectively. The first diffractive element 121a, the second diffractive element 121b, and the third diffractive element 121c are spaced apart from each other. Specifically, the waveguide element 122 is in shape of a cuboid and has a first surface 122a and a second surface 122b opposite to each other. That is, the first surface 122a and the second surface 122b of the waveguide element 122 are parallel to each other. The first diffractive element 121a and the second diffractive element 121b are on the first surface 122a and the second surface 122b respectively and aligned with each other in a direction perpendicular to one of the first surface 122a and the second surface 122b. In addition, the first diffractive element 121a is a transmissive diffractive element, and the second and third diffractive element 121b, 121c are reflective diffractive element.

With the foregoing structural and optical configurations, when the light L1 projected by the projector 110 is incident on the first diffractive element 121a, a part of the light L1 is diffracted by and transmits through the first diffractive element 121a to be diffraction light Ld1 that propagate with the first diffraction angle θ1 in the waveguide element 122. When the rest part of the light L1 that is not diffracted by the first diffractive element 121a (i.e., light L1') propagates to be incident on the second diffractive element 121b through the waveguide element 122, a part of the light L1' is diffracted and reflected by the second diffractive element 121b to be diffraction light Ld2 that propagate with the second diffraction angle θ2 in the waveguide element 122. The rest part of the light L1' that is not diffracted by the second diffractive element 121b (i.e., light L1") transmits through the second diffractive element 121b. Since the second diffraction angle θ2 is different from the first diffraction angle θ1, the diffraction light Ld1 will not enter the second diffractive element 121b and cause crosstalk, and the diffraction light Ld2 will not enter the first diffractive element 121a and cause crosstalk. The diffraction light Ld1 and the diffraction light Ld2 will propagate in the waveguide element 122 based on the principle of total internal reflection and then be diffracted and outputted by the third diffractive element 121c to be light L2. In other words, the second diffractive element 121b serves as a compensator of the first diffractive element 121a.

In this way, most of the light L1' can be reflected back into the waveguide element 122 by the second diffractive element 121b and can be further effectively diffracted by the third diffractive element 121c. That is, the light L1" is extremely small relative to the light L1. Therefore, the intensity of the light L2 outputted by the optical engine 100 can be increased at least by 50%.

In some other embodiments, the third diffractive element 121c may be a transmissive diffractive element and attached to the first surface 122a of the waveguide element 122.

In some embodiments, the third grating 121c1 and the fourth grating 121c2 are superimposed together. In some embodiments, the third grating 121c1 and the fourth grating 121c2 are in a single medium. In some embodiments, the third grating 121c1 and the fourth grating 121c2 intersect. As such, the third diffractive element 121c can have a small size.

Figure 7:
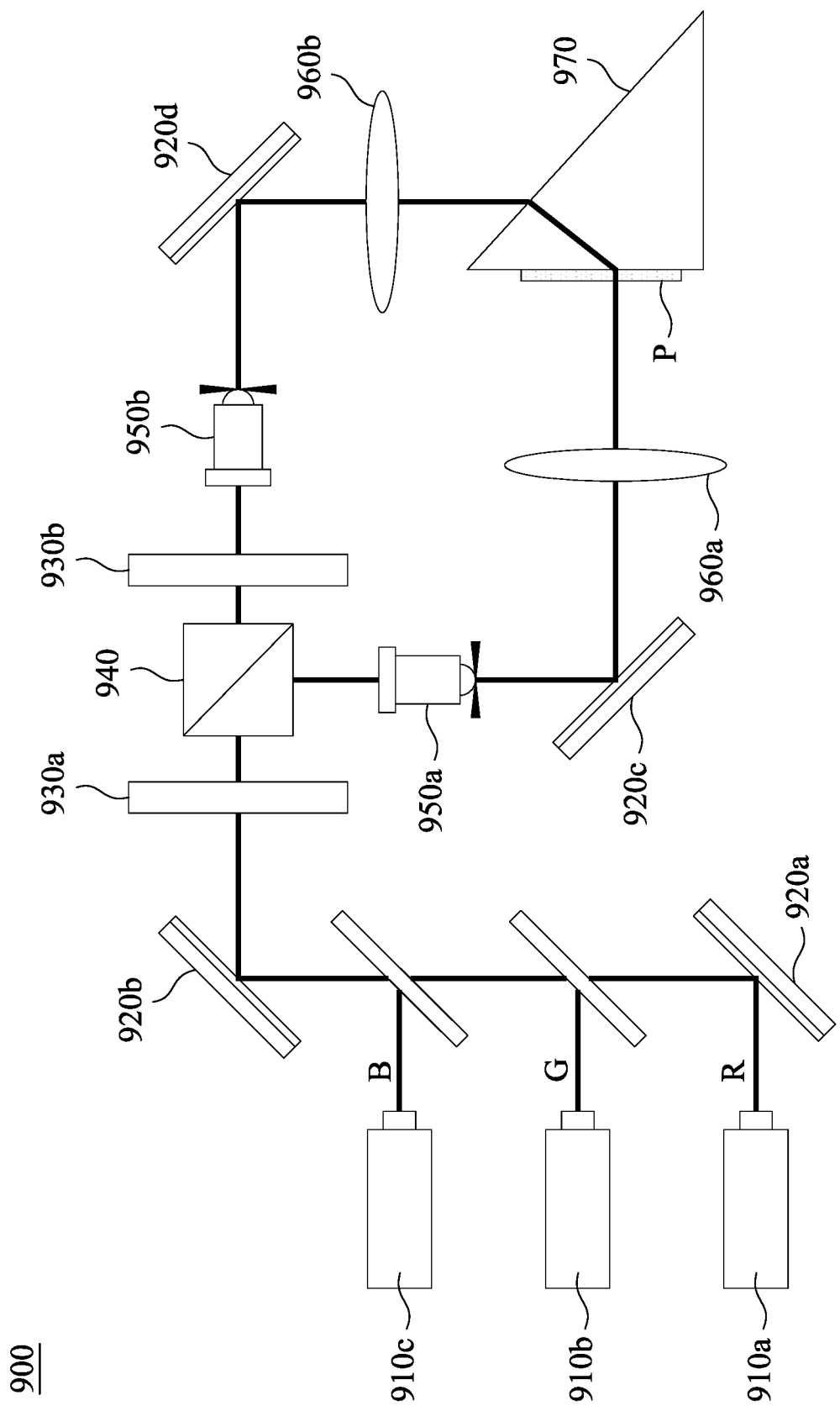
FIG. 7 is a schematic view of an optical exposure system for manufacturing a diffractive element.

Reference is made to FIG. 7. FIG. 7 is a schematic view of an optical exposure system 900 for manufacturing a holographic optical element. As shown in FIG. 7, the optical exposure system 900 includes three light sources 910a, 910b, 910c configured to emit the red light R, the green light G, and the blue light B, respectively. The optical exposure system 900 further includes four mirrors 920a, 920b, 920c, 920d, two half-wave plates 930a, 930b, a polarizing beam splitter 940, two spatial filters 950a, 950b, two lenses 960a, 960b, and a prism 970. A photopolymer is attached to a side of the prism 970. The optical exposure system 900 is configured to expose a portion of the photopolymer P with two light beams (which are integrated from the red light R, the green light G, and the blue light B) in difference incidence directions from opposite sides of the photopolymer P. The photopolymer P includes monomer, polymer, photo-initiator, and binder. When the photopolymer P is subjected to an exposure process, the photo-initiator receives photons to generate radicals, so that the monomers begin to polymerize (i.e., photopolymerization). By using the exposure method of hologram interference fringe, the monomer that is not illuminated by the light (i.e., in dark zone) is diffused to the light irradiation zone (i.e., bright zone) and polymerized, thereby causing a non-uniform concentration gradient of the polymer. And finally, after fixing, phase gratings each including bright and dark stripes arranged in a staggered manner can be formed, and the photopolymer P is transformed to the holographic optical element.

Figure 8:
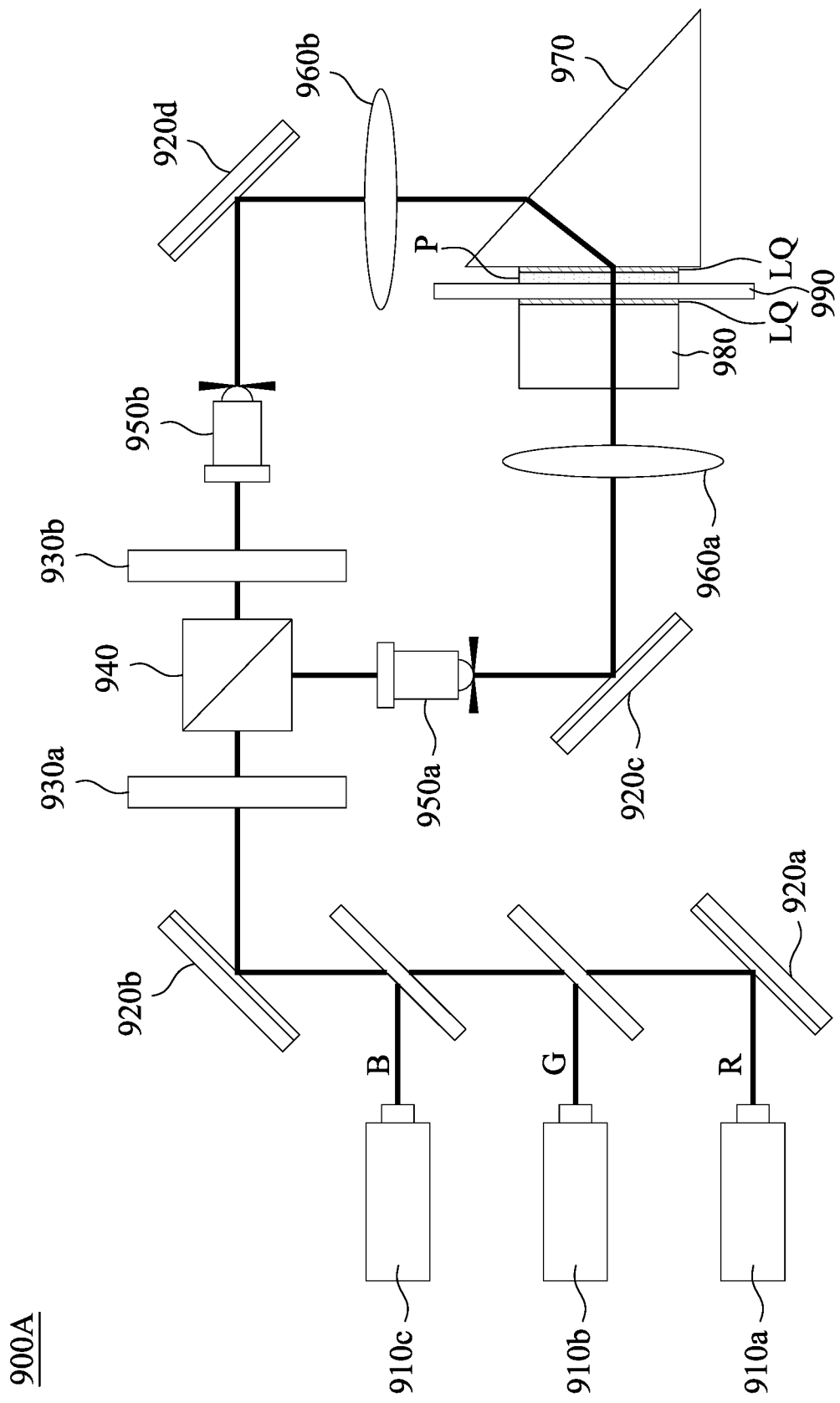
FIG. 8 is a schematic view of another optical exposure system for manufacturing a diffractive element.

Reference is made to FIG. 8. FIG. 8 is a schematic view of another optical exposure system 900A for manufacturing a holographic optical element. Compared to the optical exposure system 900 shown in FIG. 7, the optical exposure system 900A shown in FIG. 8 further includes an optical element 980, a waveguide 990, and refraction index matching liquid LQ. The waveguide 990 is located between the optical element 980 and the prism 970. The photopolymer P is attached to the waveguide 990. A part of the refraction index matching liquid LQ is sandwiched and optically coupled between the optical element 980 and a side of the waveguide 990 away from the photopolymer P. Another part of the refraction index matching liquid LQ is sandwiched and optically coupled between the prism 970 and a side of the photopolymer P away from the waveguide 990. The prism 970, the optical element 980, and the refraction index matching liquid LQ have the same refractive index. In this way, the optical exposure system 900A can adjust light with more incident angles, which allows more wavelengths to be multiplexed.

In some embodiments, the material of at least one of the optical element 980 and the waveguide 990 includes glass or plastic, but the disclosure is not limited in this regard. In some embodiments, the optical element 98 is a cube, but the disclosure is not limited in this regard. In practical applications, the optical element 98 may be a prism, a cuboid, or a trapezoid.

Figure 9:
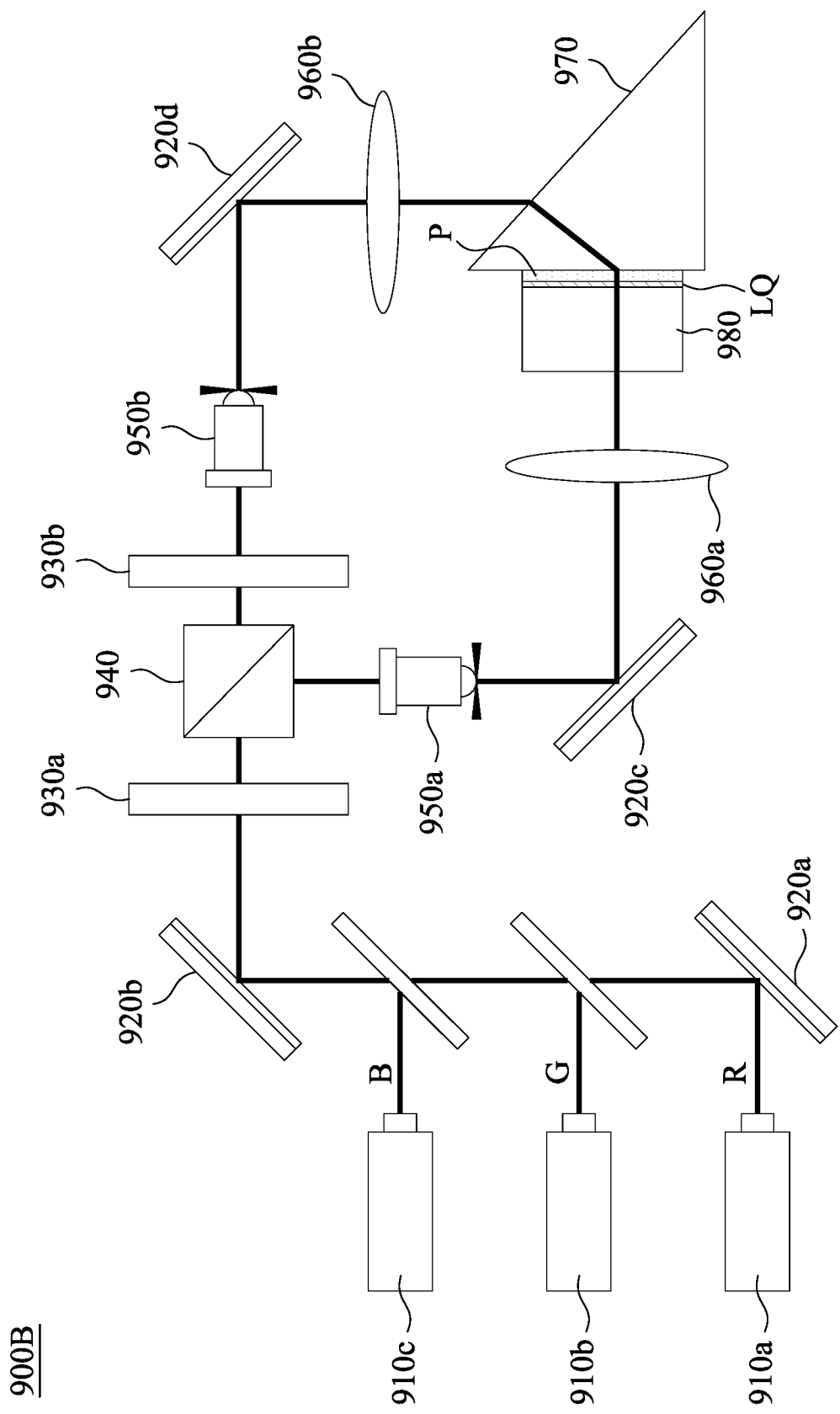
FIG. 9 is a schematic view of another optical exposure system for manufacturing a diffractive element.

Reference is made to FIG. 9. FIG. 9 is a schematic view of another optical exposure system 900B for manufacturing a holographic optical element. Compared to the optical exposure system 900A shown in FIG. 8, the waveguide 990 and the part of the refraction index matching liquid LQ sandwiched between the prism 970 and the photopolymer P are omitted. Instead, the photopolymer P is attached to the prism 970, and the refraction index matching liquid LQ is sandwiched and optically coupled between the optical element 980 and the photopolymer P and has the same refractive index as the optical element 980. In this way, the optical exposure system 900B can also adjust light with more incident angles, which allows more wavelengths to be multiplexed.

In some other embodiments, the photopolymer P in FIG. 9 may be attached to the optical element 980, and the refraction index matching liquid LQ is sandwiched and optically coupled between the prism 970 and the photopolymer P and has the same refractive index as the prism 970.

In some embodiments, at least one of the first grating 121a1, the second grating 121b1, the third grating 121c1, and the fourth grating 121c2 may be a thin holographic grating. In some embodiments, at least one of the first grating 121a1, the second grating 121b1, the third grating 121c1, and the fourth grating 121c22 may be a volume holographic grating. It is notable that light diffracted by a volume holographic grating can propagate with a specific diffraction angle based on the Bragg's law.

In some embodiments, a volume holographic grating can form a transmissive holographic grating or a reflective holographic grating according to different fabrication methods. Specifically, as shown in FIG. 7, by exposing the photopolymer P with two light beams in difference incidence directions from opposite sides of the photopolymer P, the holographic optical element can be fabricated as a reflective diffractive element (e.g., the second grating 121b1, the third grating 121c1, and the fourth grating 121c2 may be reflective holographic gratings). In some embodiments, by exposing the photopolymer P with the light beams in difference incidence directions from the same side of the photopolymer P (the optical path of the optical exposure system 900 as shown in FIG. 7 needs to be modified), the holographic optical element can be fabricated as a transmissive diffractive element (e.g., the first grating 121a1 may be a transmissive holographic grating).

In some other embodiments, at least one of the first grating 121a1, the second grating 121b1, the third grating 121c1, and the fourth grating 121c2 may be a surface relief grating.

In some embodiments, the first diffractive element 121a may further have additional gratings other than the first grating 121a1 and being configured to diffract light of other wavelengths. In some embodiments, the second diffractive element 121b may further has additional gratings other than the second grating 121b1 and being configured to diffract light of other wavelengths. In some embodiments, the third diffractive element 121c may further has additional gratings other than the third grating 121c1 and the fourth grating 121c2 and being configured to diffract light of other wavelengths.

In some embodiments, a refractive index of the waveguide element 122 is greater than refractive indices of the first diffractive element 121a and the second diffractive element 121c. As such, the diffraction light Ld1 and the diffraction light Ld2 can propagate in the waveguide element 122 based on the principle of total internal reflection. For example, the waveguide element 122 may be made of a material having a refractive index from about 1.4 to about 2.2. In some embodiments, the material of the waveguide element 122 may include glass, plastics, or transparent polymers.

According to the foregoing recitations of the embodiments of the disclosure, it can be seen that in some embodiments of the optical engine of the present disclosure, a mechanism to recycle the lost light is provided. Specifically, after the light projected by the projector enters the waveguide element through the first diffractive element, most of the lost light (i.e., zero order light or DC term, which is the part of the light that is not diffracted by the first diffractive element) can be reflected back into the waveguide element by the second diffractive element and can be further effectively diffracted by the third diffractive element. Therefore, the intensity of the light outputted by the optical engine can be increased at least by 50%.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A waveguide device, comprising:
   a first diffractive element having a first grating configured to diffract light of a wavelength to propagate with a first diffraction angle;
   a second diffractive element having a second grating configured to diffract the light of the wavelength to propagate with a second diffraction angle;
   a third diffractive element having a third grating and a fourth grating, the third grating being configured to diffract the light of the wavelength to propagate with the first diffraction angle, and the fourth grating being configured to diffract the light of the wavelength to propagate with the second diffraction angle, wherein the third grating and the fourth grating intersect; and
   a waveguide element configured to guide light propagated from the first diffractive element and the second diffractive element to the third diffractive element,
   wherein the first diffractive element and the second diffractive element are at opposite sides of the waveguide element respectively.

2. The waveguide device of claim 1, wherein the third diffractive element having the third grating and the fourth grating is a single-piece structure.

3. The waveguide device of claim 1, wherein the third diffractive element and one of the first diffractive element and the second diffractive element are at an identical side of the waveguide element.

4. The waveguide device of claim 1, wherein the waveguide element has a first surface and a second surface opposite to each other, and the first diffractive element and the second diffractive element are on the first surface and the second surface respectively and aligned with each other in a direction perpendicular to one of the first surface and the second surface.

5. The waveguide device of claim 1, wherein one of the first diffractive element and the second diffractive element is a transmissive diffractive element, and another of the first diffractive element and the second diffractive element is a reflective diffractive element.

6. The waveguide device of claim 1, wherein a refractive index of the waveguide element is greater than refractive indices of the first diffractive element and the second diffractive element.

7. The waveguide device of claim 1, wherein the first, second, and third diffractive elements are spaced apart from each other.

8. An optical engine, comprising:
a projector configured to project light of a wavelength;
a first diffractive element having a first grating configured to diffract the light of the wavelength to propagate with a first diffraction angle;
a second diffractive element having a second grating configured to diffract the light of the wavelength to propagate with a second diffraction angle;
a third diffractive element having a third grating and a fourth grating, the third grating being configured to diffract the light of the wavelength to propagate with the first diffraction angle, and the fourth grating being configured to diffract the light of the wavelength to propagate with the second diffraction angle, wherein the third grating and the fourth grating intersect; and
a waveguide element configured to guide light propagated from the first diffractive element and the second diffractive element to the third diffractive element,
wherein the first diffractive element and the second diffractive element are at opposite sides of the waveguide element respectively.

9. The optical engine of claim 8, wherein the third diffractive element having the third grating and the fourth grating is a single-piece structure.

10. The optical engine of claim 8, wherein the third diffractive element and one of the first diffractive element and the second diffractive element are at an identical side of the waveguide element.

11. The optical engine of claim 8, wherein the waveguide element has a first surface and a second surface opposite to each other, and the first diffractive element and the second diffractive element are on the first surface and the second surface respectively and aligned with each other in a direction perpendicular to one of the first surface and the second surface.

12. The optical engine of claim 8, wherein one of the first diffractive element and the second diffractive element is a transmissive diffractive element, and another of the first diffractive element and the second diffractive element is a reflective diffractive element.

13. The optical engine of claim 8, wherein a refractive index of the waveguide element is greater than refractive indices of the first diffractive element and the second diffractive element.

14. The optical engine of claim 8, wherein the first, second, and third diffractive elements are spaced apart from each other.

15. The optical engine of claim 8, further comprising a beam splitting module optically coupled between the projector and the first diffractive element.

16. The optical engine of claim 15, wherein the beam splitting module comprises a plurality of splitters arranged away from the projector along one dimension.

* * * * *